United States Patent [19]

Brown

[11] Patent Number: 4,475,590

[45] Date of Patent: Oct. 9, 1984

[54] METHOD FOR INCREASING OIL RECOVERY

[75] Inventor: Lewis R. Brown, Starkville, Miss.

[73] Assignee: The Standard Oil Company, Chicago, Ill.

[21] Appl. No.: 449,080

[22] Filed: Dec. 13, 1982

[51] Int. Cl.$^3$ .............................................. E21B 43/22
[52] U.S. Cl. ..................................... 166/246; 166/273
[58] Field of Search ......................... 166/246, 273–275

[56] References Cited

U.S. PATENT DOCUMENTS

| | | | |
|---|---|---|---|
| 2,413,278 | 12/1946 | Zobell | 166/264 |
| 2,660,550 | 11/1950 | Updegraff et al. | 166/246 |
| 2,907,389 | 10/1959 | Hitzman | 299/17 |
| 3,032,472 | 5/1962 | Hitzman | 166/246 |
| 3,332,487 | 7/1967 | Jones | 166/246 |
| 3,340,930 | 9/1967 | Hitzman | 166/246 |

OTHER PUBLICATIONS

Zobell, "Bacterial Release of Oil from Oil-Bearing Materials, Part 1", *World Oil*, 8-25-47, pp. 36, 39, 40, 42, 44 and 47.

*Primary Examiner*—Stephen J. Novosad

[57] ABSTRACT

A method of treating a subterranean oil-bearing formation having an in-situ microbial population therein. In a preferred embodiment, the method permits increased oil recovery by stimulating the growth of the in-situ microbial populations. Nutrients, including nitrogenous- and phosphorous-containing compounds, are injected into the formation concurrent with or subsequent to a waterflood. The nutrients can be injected sequentially, and the sequence can be varied or repeated as necessary. Growth of the microorganisms increases displacement and sweep efficiency of a subsequent waterflood.

15 Claims, No Drawings

METHOD FOR INCREASING OIL RECOVERY

BACKGROUND OF THE INVENTION

Use of bacteria in oil recovery has been under consideration for many years. For example, U.S. Pat. No. 2,413,278 Zobell proposes the use of certain anaerobic bacteria to aid in displacing oil from oil-bearing formations. Most work dealing with the use of bacteria in oil-bearing formations has dealt with anaerobic bacteria since it is believed most such formations contain little or no dissolved oxygen. However, there is no consensus about how much oxygen is present in connate water in a reservoir, and to what extent anaerobic bacteria can use oxygenated and nonoxygenated hydrocarbons as a source of carbon and energy. Whether or not such growth occurs may be a function of the composition of the crude oil in situ. As noted in U.S. Pat. No. 3,332,487, Jones, because they rely on the slow low-energy reactions, anaerobic bacteria cannot attack the low molecular weight hydrocarbons containing less than about 10 carbon atoms per molecule.

Theoretically, microorganisms are believed to achieve increased oil recovery by one or more of the following mechanisms: (a) reducing viscosity by degrading higher molecular weight hydrocarbons, thereby producing carbon dioxide which is dissolved into the remaining in-situ oil, (b) producing organic acids which dissolve cementing materials in the formation thereby creating flow passages, (c) producing surfactants or (d) physically displacing the oil adhering to particles of sand in the formation. These theses have been proposed, among others, in the following U.S. patents and publications: U.S. Pat. No. 2,907,389, Hitzman; U.S. Pat. No. 3,032,472, Hitzman; U.S. Pat. No. 2,660,550, Updegraff, et al.; *Petroleum Microbiology*, 1967, Elsevier Publication Co.; "The Role of Microorganisms in Secondary Oil Recovery", Proc. Chem. Specialties Manufacturers Assn., Vol. 55, Page 125, 1958; and "Bacterial Release of Oil", World Oil, Pages 36–47, 1947.

In addition, the use of microorganisms to enhance sweep efficiency in waterfloods has been proposed wherein the microorganisms would plug the most porous portions of the reservoir, thereby reducing the tendency of water to "finger" through the reservoir.

It has been suggested that there are no viable naturally-occurring microorganisms in oil bearing formations, so that any existing microorganisms in such formations have invaded as contaminants of the water used in waterfloods, or as contaminants of the water in active aquifers underlying the oil bearing formation which invades the formation after substantial oil production has taken place. Numerous proposals have been made to introduce microorganisms into oil-bearing formations to either supplement existing microorganisms or to initially colonize the formation. However, these techniques have been unsuccessful because the microorganisms tend to be filtered out at or near the formation face, resulting in severe flow restriction into the formation, or plugging.

It is known that microorganisms can and will grow under the environmental conditions existing in a typical oil bearing formation if proper nutrients are available. Nutritionally, oil and formation brine are deficient in usable sources of both nitrogenous- and phosphorus-containing compounds, which tends to prevent growth of most microorganisms, or at best permits growth at a very slow rate. Since microorganisms require water and are generally holophytic (they require their nutrients in solution), and since crude oil is not miscible with water, growth of microorganisms must take place primarily at the oil-water interface. All necessary elements and water must be present for growth and metabolism to take place. An adequate carbon and energy source is readily available in the reservoir in the form of crude oil, so that if proper nutrients are provided growth of the microorganisms can be stimulated.

SUMMARY OF THE INVENTION

The present invention comprises a method of treating a subterranean oil-bearing reservoir having an in-situ microbial population therein. It is believed that the microorganisms originally enter the oil-bearing formations either in water injected in the formation during secondary waterfloods, or by invasion of water into the formation from adjacent aquifers after the reservoir has been partially depleted by oil production. The microorganisms subsist but do not proliferate to any appreciable extent in the reservoir because of nutritional deficiencies, primarily nitrogen and phosphorus. The present invention comprises the injection into the formation of a nutrient media, which in one embodiment, comprises nitrogenous- and phosphorus-containing compounds. This injection can be effected either concurrent with or subsequent to a primary waterflood. During a period of continued waterflooding, growth of sufficient microorganisms will occur, resulting in appreciably increased oil recovery as well as increased sweep efficiency. Prior to or during waterflooding, injection of either the nitrogenous- or phosphorus-containing solutions can be repeated to maximize as well as control microbial growth and subsequent oil recovery and/or sweep efficiency.

The nitrogen-containing source may comprise an aqueous solution of an inorganic nitrogen source such as ammonium or nitrate ions, organic nitrogen sources, or any other nitrogen source which is capable of being assimilated by microorganisms, in a concentration of from about 1 to about 100 ppm. The phosphorus-containing solution may comprise an aqueous solution of an inorganic phosphorus source such as disodium hydrogen phosphate, monosodium dihydrogen phosphate, phosphoric acid, or any other phosphorus source capable of being assimilated by microorganisms, in a concentration of about 0.1 to about 50 ppm. Preferably, from about 2 to about 10 ppm nitrate-nitrogen and from about 0.5 to about 5 ppm phosphate phosphorus are utilized. The actual concentrations used will, of course, be dictated by specific reservoir characteristics, availability of nutrients, losses due to adsorption, and the like.

DETAILED DESCRIPTION OF THE INVENTION

For the purposes of this disclosure, the specific microorganisms are unimportant, in that most of those potentially present in the reservoir are acceptable to obtain the purposes of the invention. Representative microorganisms which may be present either singly or in combination in a reservoir, are represented by the genera Pseudomonas, Achromobacter, Arthrobacter, Flavobacterium, Vibrio, Acinetobacter, Bacillus, Micrococcus, and Clostridium. The oil-degrading microorganisms utilized in the experiments reported herein were isolated from crude oil enrichment cultures using conventional microbiological techniques.

From a practical standpoint, it is believed unlikely that sufficient quantities of microorganisms could be added to a formation to effect appreciable change. Sand filters are highly efficient in removing bacteria and microbes in water purification plants, and the sand in a typical reservoir formation would probably filter out a large portion of the microorganisms at or near the formation face at the wellbore. Therefore, indigenous microorganisms are utilized in the method of the present invention. While the term indigenous is used to refer to organisms naturally occurring in the formation, the process of the present invention is practiced during a waterflood or after waterflooding has been in progress for some time, which may permit artificially introduced microorganisms to be involved in accomplishing the objects of the invention.

Oil-degrading microorganisms are capable of sustaining a minimal population in most formations but do not flourish. Crude oil provides adequate carbon and energy, but is nutritionally deficient in both nitrogen and phosphorus. Most microorganisms are known to exhibit "biosorption"—a phenomenon known to occur in microbial populations which are in a state of starvation. When presented with excess quantities of a deficient nutrient, the microorganisms will absorb it in quantities far in excess of that amount which can be rapidly metabolized. Usually, the phenomenon refers to the uptake of utilizable organic matter, such as practiced in a municipal waste disposal process. In the case of microorganisms existing in a subterranean hydrocarbon-bearing formation, the nutritional deficiencies are primarily nitrogen- and phosphorus-containing compounds, not carbonaceous materials. Presentation of these compounds in controlled amounts to a nutritionally deficient microbial population can offer a means of controlling the growth of the microorganisms in the formation.

While it is believed that the absence of nitrogen- and phosphorus-containing compounds are the primary growth-limiting nutrients, Applicant does not wish to limit the invention to only such compounds. However, because in most cases these will be the nutrients limiting growth, the following discussion will concentrate on, but not be limited to, nitrogen- and phosphorus-containing compounds.

Microbial utilization of crube oil can be evidenced by a change in the hydrocarbon constituents in which the microorganisms are growing. The depletion of short chain aliphatic compounds and the production of long chain aliphatic compounds and long chain fatty acids and alcohols may be expected by microorganisms which are truly oil-degrading.

EXPERIMENTAL PROCEDURES

Biosorption studies were conducted using microorganisms isolated from crude oil enrichment cultures and grown in Tryptic Soy Broth, harvested by centrifugation, and washed several times with physiological saline to remove extraneous nutrients. The bacterial cells were depleted of endogenous nutrients by incubating at 45° C. for 24 hours. The cells were then diluted such that a concentration of $1 \times 10^{10}$ cells/ml was obtained, and divided into two aliquots. One aliquot was subjected to 80° C. for 20 minutes and used as a control, while the other aliquot was not subjected to heat. Twenty-five ml of each aliquot was exposed to either 0.1% $NH_4Cl$ (w/v) or 0.15% $KH_2PO_4$ (w/v) for varying lengths of time at 45° C. At the end of each time interval, the cells were collected by filtration using a $0.45\mu$ membrane filter. The bacterial cells were washed with 15 ml of distilled water and assayed for either ammonium-nitrogen by direct Nesslerization or for orthophosphate using a stannous chloride method (*Standard Methods for the Examination of Water and Wastewater*. 1971. 13th Edition. American Public Health Association, Washington, D.C. 20036). This procedure was utilized to obtain the results reported in Tables 1 and 2.

The remaining experiments were carried out using Berea sandstone cores treated such that they simulated the reservoir at residual waterflood oil saturation. The general procedure for accomplishing the above was as follows.

Wrapped Berea sandstone cores (four feet in length and fitted with sampling ports in some instances) were evacuated and then filled with artificial production water prepared to simulate the production water obtained from the South Hobbs Units No. 7 and 138. The artificial production water was composed of $MgSO_4$, 1.083 g; $CaCl_2$, 1.981; $Na_2SO_4$, 0.142 g; NaCl, 5.790 g; and distilled water, 1000 ml. The cores were then flushed with crude oil obtained from Well No. 48 in the Hobbs Oil Field until no visible water was expelled from the cores. Artificial production water was then flushed through the core until no oil was present in the effluent from the core. The cores were placed in a longitudinal position, wrapped with heating coils and maintained at 45° C. for two weeks prior to use.

Control cores (no microorganisms present) were sterilized prior to use by thoroughly flushing the cores with carboxide gas (10% ethylene oxide) and holding the cores at 10 psi for 24 hours. All artificial production water was autoclaved (121° C. for 15 minutes) prior to use and all crude oil was sterilized by passage through $0.45\mu$ membrane filters.

Test cores containing microorganisms were prepared by mixing enrichment cultures of oil-degrading microorganisms with the crude oil and introducing the oil-bacteria mixture into the core during establishment of the initial oil saturation.

In tests conducted using cores fitted with sampling ports, the sampling ports in the casement were cleansed with 70% ethanol and the samples collected either in sterilized test tubes or in 3 ml disposable syringes. The sampling ports were spaced along the length of the core, from less than 10 inches from the site of injection to 47 inches from injection site. To enumerate microbial numbers, the samples were serially diluted in sterile artificial production water. Twenty microliter samples from each dilution were spread onto the surface of Bacto Marine Agar (Difco Laboratories, Detroit, MI) and the plates incubated at 45° C. for 48 hours.

Chemical analyses for aliphatic hydrocarbons were performed on samples extracted with hexane and analyzed using a Beckman GC-45 gas chromatograph fitted with a ⅛-inch by six-foot column filled with 5% FE-30 on a chromosorb W column. The residue obtained from the above was refluxed overnight with KOH and then extracted with hexane again. The residue was then extracted with chloroform and the $CHCl_3$ extract was analyzed for hydrocarbons and fatty acid esters. Another portion of the chloroform extract was treated with diazomethane in the presence of ethyl ether after removal of the chloroform by evaporation and analyzed for fatty acid methyl esters.

Treatment of the cores after the 14-day stabilization period consisted of flushing the various cores with sterile artificial production water, sterile artificial production water containing sodium nitrate, sterile artificial production water containing disodium hydrogen phosphate, sterile artificial production water containing both sodium nitrate and disodium hydrogen phosphate, sterile artificial production water containing glucose, or sterile artificial production water containing sodium nitrate, disodium hydrogen phosphate and glucose as outlined in the results.

The nitrate stock solution was prepared by dissolving 400 mg of $NaNO_3$ in 10 ml artificial production water. The working nitrate solution was prepared by mixing 0.5 ml of stock solution with 1,000 ml of the artificial production water. Approximately 300 ml of the nitrate solution was introduced into the Berea cores at the rate of 10–12 ml/hr. The phosphate stock solution was prepared by dissolving 10 mg $Na_2HPO_4$ in 30 ml artificial production water. The phosphate solution for flushing the core was then prepared by mixing 3 ml of stock solution with 300 ml artificial production water. Approximately 300 ml of the phosphate solution was introduced into the Berea cores at the rate of 10–12 ml/hr. The glucose solution was prepared by adding 0.5 g of glucose to 100 ml of artificial production water. All solutions were sterilized prior to use. The nitrate and phosphate solutions were sterilized by autoclaving at 121° C. for 15 minutes while the glucose solution was sterilized by filtration using a 0.45$\mu$ membrane filter.

EXPERIMENTAL RESULTS

TABLE 1

Biosorption of Ammonium-Nitrogen by Oil-Degrading Microorganisms

| Exposure Time | Ammonium Uptake[1] |
|---|---|
| 15 minutes | 0.12 $\mu$g |
| 30 minutes | 0.14 $\mu$g |
| 60 minutes | 2.50 $\mu$g |
| 24 hours | 22.00 $\mu$g |

TABLE 2

Biosorption of Phosphate-Phosphorus by Oil-Degrading Microorganisms

| Exposure Time | Phosphate Uptake[1] |
|---|---|
| 15 minutes | 3.2 $\mu$g |
| 30 minutes | 8.5 $\mu$g |
| 60 minutes | 12.0 $\mu$g |
| 90 minutes | 16.0 $\mu$g |
| 120 minutes | 18.5 $\mu$g |

[1]No ammonium or phosphate uptake by the dead cell control.

The data in Tables 1 and 2 demonstrate the phenomenon of biosorption and clearly indicate that starved, oil-degrading microorganisms rapidly bioabsorb ammonium-nitrogen and phosphate-phosphorus in excess of their nutritional requirements. The next test was performed using a wrapped Berea sandstone core prepared to simulate an oil-bearing formation at waterflood residual oil saturation containing in-situ microorganisms. The purpose of this test is to show that biosorption occurs in-situ in a core and that microbial attack on crude oil will also occur if limiting nutrient requirements are satisfied. The number of microorganisms introduced into the core was relatively low and even after two weeks their number were below detection when sampled through the sampling ports. The chemical profile of the oil was unchanged, indicating that very little, if any, microbial activity was taking place in the core in its steady-state condition.

The results of periodic monitoring of the cores for numbers of microorganisms are shown in Table 3.

TABLE 3

The Effect of Nitrate and Phosphate on the Microflora in Four-foot Berea Sandstone Cores

| Days | Treatment | 2nd Port[1] | 8th Port[2] | 14th Port[3] |
|---|---|---|---|---|
| 1 | — | NG | NG | NG |
| 7 | nitrate added | NG | NG | NG |
| 14 | phosphate added | 400,000 | 40,000 | 500 |
| 21 | | 1,000,000 | 860,000 | 60,000 |
| 28 | | 3,000,000 | 400,000 | 95,000 |
| 49 | | 500,000 | 20,000 | 8,500 |
| 64 | | 850,000 | 18,000 | 3,500 |
| 84 | phosphate added | 400,000 | 16,000 | NG |
| 91 | | 4,000,000 | 380,000 | NG |
| 98 | | 8,500,000 | 420,000 | 35,000 |
| 119 | | 4,200,000 | 46,000 | 6,500 |
| 134 | | 420,000 | 15,000 | NG |

[1]2nd port was 10 inches from the site of injection.
[2]8th port was 22 inches from the site of injection.
[3]14th port was 47 inches from the site of injection.
NG = No growth of microorganisms was observed (< 5/ml).

It is apparent that the numbers of microorganisms decreased with increasing distance from the site of introduction of the nutrients. This is to be expected due to the filtering effect both upon introduction of microorganisms and upon introduction of nutrients into the cores. While steps were taken to reduce as much as possible the filtering out of microorganisms soon after introduction, a certain amount will inevitably occur when making simulated reservoir cores. It is expected that in-situ microbial populations will be relatively evenly distributed throughout the formation so that this phenomenon would not be observed. The fact that the microbial numbers increase significantly by Day 14 after the addition of nitrate alone (added at Day 7) suggests that a severe nitrogen deficiency existed in the in-situ microbial population. The even more dramatic increase in microorganism numbers (by Day 21) after the addition of the phosphate (at Day 14) indicates that the cells also suffered from a phosphorus deficiency. The decrease in the number of viable cells with time, after the initial surge following nutrient injections, coupled with the resurgence in numbers after additional phosphate was injected at Day 84, suggests that the concentration of phosphate is rate-limiting. Not only do the number of microorganisms increase after introduction of nutrients, but their increased activity is evidenced by a substantial loss in the short chain aliphatics and by the production of long-chain ($C_{24}$–$C_{25}$) aliphatic hydrocarbons and long-chain fatty acids. Concurrent with the increase in microorganism populations, the chemical composition of the oil was altered. A substantial decrease in the $C_{10}$–$C_{18}$ straight-chain aliphatics (pristane and phytane) was observed, as well as the appearance of a large quantity of a $C_{24}$–$C_{25}$ aliphatic compound that was not present in the original oil. Additional analysis revealed the presence of fatty acids; the analysis showed the following fatty acid methyl esters—$C_{16}:1$, $C_{18}:1$, $C_{18}:2$, $C_{20}:1$, $C_{20}:5$, $C_{22}:5$ and $C_{22}:6$. These data illustrate that the addition of nitrate-nitrogen and phosphate-phosphorus caused an increase in the number of microorganisms and stimulated their activity on crude oil.

The next series of experiments were designed to show that growth of microorganisms, after stimulation of biosorption, will occur in sandstone cores at waterflood residual oil saturation, and that this growth results in enhanced production of tertiary oil from the cores.

The method of preparation of these cores is outlined in the experimental procedures above and is described more fully in Table 4. Core 1 and Core 2 are "control" cores which contained no microorganisms, while Core 3 and Core 4 are "test" cores which contained microorganisms. As stated previously, all cores were aged and stabilized for 14 days prior to the start of the experiments. As is explained below, the data in Table 5 show the results of these experiments and clearly demonstrate that the oil recovery from the experimental cores was more than 3.5 times as great as the recovery from the sterile control cores.

TABLE 4

Treatment of Cores Prior to Experimental Use

| Treatment | Control | | Test | |
|---|---|---|---|---|
| | Core 1 | Core 2 | Core 3 | Core 4 |
| Flushed with ethylene oxide. Left under 10 psi for 24 hours. | Yes | Yes | No | No |
| Evacuated and filled with sterile artificial production water. | Yes | Yes | Yes | Yes |
| Flushed with sterile oil until water in effluent. | Yes | Yes | No | No |
| Flushed with oil containing microorganisms until no water in effluent. | No | No | Yes | Yes |
| Flushed with sterile artificial production water until no oil in effluent. | Yes | Yes | Yes | Yes |

After 28 days, only 8 ml of oil (4.4% of the original oil) and 11 ml of oil (5.1% of original oil) had been recovered from Cores 1 and 2, respectively, which contained no bacteria. At the same time, 35 ml (13.5%) and 36 ml (21.2%) of oil were recovered from Cores 3 and 4 which contained bacteria, showing the improvement in oil recovery due to the activity of in-situ microorganisms. The experiment was continued with these cores in order to supplement the data on oil recovery, as follows:

Core No. 1: This control core received an injection of bacterial culture along with the $Na_2HPO_4$ at Day 28. The core was then shut-in for 7 days. On day 35 an additional 270 ml of injection brine containing both $NaNO_3$ and $Na_2HPO_4$ was injected. 255 ml of water and 11 ml of oil were produced. The core was then shut in for 7 days. At this point 300 ml of brine was injected and an additional 10 ml of oil and 300 ml of water were produced. After an additional 14 day shut-in period, continued injection of brine resulted in production of 275 ml of $H_2O$ and an additional 8 ml of oil. Thus, prior to the introduction of bacteria into this core it had yielded 855 ml of water and 8 ml of oil. After introduction of bacteria into the core, it yielded 830 ml of water and 29 ml of oil in the same length of time.

Core No. 2: The previously cited trend continued in this control core with no bacteria present. At Day 35 an additional 5 ml of oil and 275 ml of water were produced after injection of 300 ml of brine. After a 21 day shut-in period, 275 ml of brine containing phosphate and nitrate was injected and 2 ml of oil was produced along with 260 ml of water. After an additional 7 day shut-in period, injection of brine led to production of another 1.5 ml of oil and 300 ml of water. Thus, this control core which had no bacteria present produced 1660 ml of water and only 19.5 ml of oil (9.1% of the total original oil).

Core No. 3: This core which contained bacteria from the start continued to produce increased amounts of oil after 28 days. At Day 35 an additional 15 ml of oil was produced (250 ml of water). After a 21 day shut-in, an additional injection of brine on Day 56 containing nitrate and phosphate led to production of 6 ml of additional oil and 255 ml of water. On Day 63 an additional 8 ml of oil and 300 ml of water were produced and on Day 84 another 13 ml of oil and 285 ml of water were produced. Thus, this test core yielded 1900 ml of production water and 77 ml of oil (29.6% of the original oil).

Core No. 4: This core was shut-in from Day 28 to Day 49. At this point, 260 ml of brine was injected which contained nitrate, phosphate and 0.5% glucose as a carbon source. Oil production continued with 12 ml of oil and 250 ml of water being produced. After a 3 day shut-in period injection of brine was resumed, but very little fluid was produced due to plugging of the core by the bacterial cells. These results demonstrate that uncontrolled bacterial growth provided by a ready carbon source will result in lost oil production due to permeability reduction. However, it also supports the concept that controlled growth can alter reservoir permeability and lead to sweep improvement effects as a positive benefit.

TABLE 5

Effect of Treatment on the Fluid Recovery from Experimental Cores

| | Control | | | | Test | | | |
|---|---|---|---|---|---|---|---|---|
| | Core 1 | | Core 2 | | Core 3 | | Core 4 | |
| Day | ml $H_2O$ Produced | ml Oil Produced | ml $H_2O$ Produced | ml Oil Produced | ml $H_2O$ Produced | ml Oil Produced | ml $H_2O$ Produced | ml Oil Produced |
| 1 | Injected 280 ml $NaNO_3$ solution | | | | | | | |
| | 280 | 0 | 280 | 0 | 280 | 0 | 280 | 0 |
| | Shut in cores 3 days | | | | | | | |
| 4 | Injected 275 ml $Na_2HPO_4$ solution | | | | | | | |
| | 275 | 2 | 275 | 2 | 250 | 10 | 280 | 10 |
| | Shut in cores 3 days | | | | | | | |
| 7 | Injected 300 ml Artificial Brine | | | | | | | |
| | 300 | 4 | 250 | 6 | 285 | 12 | 275 | 8 |
| | Shut in cores 21 days | | | | | | | |
| 28 | Injected 280 ml $Na_2HPO_4$ | | | | | | | |
| | 280 | 2 | 300 | 3 | 275 | 13 | 300 | 18 |

TABLE 5-continued

Effect of Treatment on the Fluid Recovery from Experimental Cores

| | Control | | | | Test | | | |
|---|---|---|---|---|---|---|---|---|
| | Core 1 | | Core 2 | | Core 3 | | Core 4 | |
| Day | ml $H_2O$ Produced | ml Oil Produced | ml $H_2O$ Produced | ml Oil Produced | ml $H_2O$ Produced | ml Oil Produced | ml $H_2O$ Produced | ml Oil Produced |
| Shut in cores 7 days | | | | | | | | |

The microorganisms introduced into Cores 3 and 4 were prepared as follows:

Hobbs crude oil (5 ml) plus production water (5 ml) obtained from wells in the Hobbs field were added to 50 ml mineral salts medium (1.0 g $KNO_3$; 0.5 g $K_2HPO_4.3-H_2O$; 0.2 g $MgSO_4.7H_2O$; 0.05 g $FeCl_3.6H_2O$; 1000 ml distilled water and pH adjusted to 7.0 with 10% (v/v) HCl) contained in a 6 oz prescription bottle and incubated at 45° C. without agitation. When growth became evident (usually 1-2 weeks), the culture was vigorously shaken, allowed to separate and the oil portion added to fresh Hobbs crude oil in a ratio of approximately 50 ml enrichment crude oil to 250 ml of fresh crude oil.

While not wishing to be held to any specific theory, applicant believes that one of three processes may be responsible for the increased oil recovery concurrent with the microbial growth. The oil-degrading microorganisms producing the long chain fatty acids (and/or alcohols) can create an in-situ surfactant at the oil-water front, which leads to reduced interfacial tension therebetween and increases the displacement efficiency of a concurrent or subsequent waterflood. Alternatively, it is possible that the growth of such a large number of microorganisms in a confined area can physically dislodge or displace oil from reservoir rocks. Though rather unlikely, it is possible that the microorganism may be producing a biopolymer, such as a polysaccharide, which plugs the more porous portions of the reservoir thereby reducing fingering of the water during a waterflood and increasing sweep efficiency.

Assuming microbial populations exist throughout the subterranean formations where waterfloods occur, the present invention may provide a method of selectively plugging porous strata and thereby increase sweep efficiency. By injecting nutrients into a porous formation (referred to as a "thief zone") which diverts a large quantity of water away from the less porous, oil-containing formations, the nutrients will selectively stimulate microbial growth in the porous formations, and if, for example, glucose is injected with the nutrients, the thief zone can be plugged off and sweep efficiency improved.

It is to be understood that the forms of the invention shown and described herein are to be taken only as preferred embodiments. Various changes and modifications may be made within the basic process without departing from the scope or intent of the appended claims. Those skilled in the art will recognize, or be able to determine using no more than routine experimentation, other equivalents to the specific embodiments described herein.

I claim:

1. A method of oil recovery from an oil-bearing subterranean formation involving stimulating the growth of an in-situ microbial population, wherein said microbial population's growth is partially limited because of deficiencies in the amounts of nitrogenous- and phosphorus-containing compounds available in the formation, said formation being penetrated by at least one injection well and at least one producing well, comprising:

(a) injecting into said formation an aqueous nitrogenous solution;
   (b) injecting into said formation an aqueous phosphorus-containing solution;
   (c) adjusting the amount of injected aqueous nitrogenous solution and aqueous phosphorus-containing solution to control the growth of said microbial population, and
   (d) injecting a drive fluid into said formation to displace oil to said production well.

2. The method as recited in claim 1 wherein said aqueous nitrogenous solution comprises a nitrogen source selected from the group consisting essentially of ammonium ions, nitrate ions or nitrite ions, and said phosphorous-containing solution comprises a phosphorous source in the form of an inorganic phosphate.

3. A method as recited in claim 1 wherein the nitrogenous solution is provided in a concentration between about 1 and 100 ppm and the phosphorous containing solution is provided in a concentration between about 0.1 and 50 ppm.

4. The method as recited in claim 1 wherein said microorganism degrades the oil in said formation and produces a fatty acid or fatty alcohol.

5. The method as recited in claim 4 wherein said fatty acid or fatty alcohol reduces the interfacial tension at the oil/injected water interface in said formation.

6. The method as recited in claim 1 wherein said nitrogenous- and phosphorus-containing solutions are injected into the formation through relatively permeable portions of said formations, such that growth of the microorganisms is stimulated primarily in said permeable portions.

7. The method as recited in claim 6 wherein said microorganisms produce a polymer-like material in said permeable portions of the formation, such that flow through said permeable portions is substantially reduced during subsequent waterflooding, by said polymer-like material.

8. A method as recited in claim 1 wherein Steps (a), (b) and (c) are performed sequentially, as a further method of controlling the growth of said microbial population.

9. The method as recited in claim 1 wherein either or both of Steps (a) or (b) is repeated, as a further method of controlling the growth of said microbial population.

10. The method as recited in claim 1 comprising regulating the growth of said microbial populations by varying the amount and timing of the injection of said nitrogenous- and phosphorous-containing solutions.

11. A method for improving the sweep efficiency of a waterflood in an oil-bearing formation, by stimulating the growth of in-situ microbial population, where said microbial population's growth is partially limited because of deficiencies in the amounts of nitrogenous- and phosphorus-containing compounds available in said formation, comprising:

(a) injecting into said formation an aqueous nitrogenous solution;

(b) injecting into said formation an aqueous phosphorus-containing solution;

(c) adjusting the amounts of injected aqueous nitrogeneous solution and aqueous phosphorus-containing solution to control the growth of said microbial population, and (d) injecting water in said formation to displace oil to a production well.

12. A method as recited in claim 11 wherein Steps (a), (b) and (c) are performed sequentially, as a further method of controlling the growth of said microbial population.

13. The method as recited in claim 12 wherein either or both of Steps (a) or (b) is repeated, as a further method of controlling the growth of said microbial population.

14. A method of treating a subterranean formation having an in-situ microbial population therein, where said microbial population, although able to obtain sufficient carbon and energy for metabolism from the oil in said formation, has its growth limited by deficiencies of nitrogenous- and phosphorus-containing compounds, comprising injecting into the formation a nutrient media comprising a solution of nitrogenous- and phosphorus-containing compounds, and controlling the growth of said microbial population by controlling the amounts of injected aqueous nitrogenous solution and aqueous phosphorus containing solution.

15. The method as recited in claim 14 wherein said nitrogenous- and phosphorus-containing compounds are injected into said formation sequentially.

* * * * *